US010486913B2

(12) United States Patent
Scholz et al.

(10) Patent No.: US 10,486,913 B2
(45) Date of Patent: Nov. 26, 2019

(54) TRANSPORT DEVICE AND TRANSPORT METHOD COMPRISING SUCH A TRANSPORT DEVICE

(71) Applicant: KHS GmbH, Dortmund (DE)

(72) Inventors: Ulrich Scholz, Lüdinghausen (DE); Sebastian Götze, Dortmund (DE); Thomas Stienen, Unna (DE)

(73) Assignee: KHS GmbH, Dortmund (DE)

(*) Notice: Subject to any disclaimer, the term of this patent is extended or adjusted under 35 U.S.C. 154(b) by 0 days.

(21) Appl. No.: 15/752,754

(22) PCT Filed: Jul. 28, 2016

(86) PCT No.: PCT/EP2016/068117
§ 371 (c)(1),
(2) Date: Feb. 14, 2018

(87) PCT Pub. No.: WO2017/029100
PCT Pub. Date: Feb. 23, 2017

(65) Prior Publication Data
US 2018/0229942 A1 Aug. 16, 2018

(30) Foreign Application Priority Data

Aug. 14, 2015 (DE) .......................... 10 2015 113 435

(51) Int. Cl.
| | |
|---|---|
| *B65G 43/08* | (2006.01) |
| *B65G 23/30* | (2006.01) |
| *B65G 23/32* | (2006.01) |
| *B65G 47/26* | (2006.01) |

(Continued)

(52) U.S. Cl.
CPC .............. *B65G 43/08* (2013.01); *B65G 15/30* (2013.01); *B65G 17/06* (2013.01); *B65G 21/14* (2013.01);
(Continued)

(58) Field of Classification Search
CPC ...... B65G 23/30; B65G 23/32; B65G 47/268; B65G 43/08; B65G 15/30; B65G 17/06;
(Continued)

(56) References Cited

U.S. PATENT DOCUMENTS 2,759,596 A * 8/1956 Keller .................... B65G 23/04
198/830
3,225,898 A * 12/1965 Roinestad ............ B65G 17/063
198/852

(Continued)

FOREIGN PATENT DOCUMENTS

| DE | 19 45 932 | 3/1971 |
|---|---|---|
| DE | 38 41 660 | 3/1990 |

(Continued)

OTHER PUBLICATIONS

"Patent Translate DE 102011080414", EPO and Google. (Year: 2018).*

*Primary Examiner* — Mark A Deuble
(74) *Attorney, Agent, or Firm* — Occhiuti & Rohlicek LLP

(57) ABSTRACT

A transport device includes a first transport-element that comprises rotatable transport-element sections and that defines a transport path for transporting materials between front and rear deflection-devices. The path has successive sections along a transport direction and extends between drive-arrangements spaced apart along the transport path. The drive-arrangements interactively connect to the transport-element at different locations along the transport path. Rotatable transport-element sections are repositioned relative to one another in such a way to change an overall length of the first transport-element. Targeted controlling of adjacent transport path sections at a differential speed by way of the first and second drive-arrangements creates an accumulation or a gap of transport material on a transport-path section.

24 Claims, 7 Drawing Sheets

(51) Int. Cl.
*B65G 47/28* (2006.01)
*B65G 15/30* (2006.01)
*B65G 17/06* (2006.01)
*B65G 21/14* (2006.01)

(52) U.S. Cl.
CPC .............. *B65G 23/30* (2013.01); *B65G 23/32* (2013.01); *B65G 47/268* (2013.01); *B65G 47/28* (2013.01)

(58) Field of Classification Search
CPC ........ B65G 21/14; B65G 47/28; B65G 23/34; B65G 23/36; B66B 21/12
USPC .......................... 198/812, 850–853, 334, 815
See application file for complete search history.

(56) References Cited

U.S. PATENT DOCUMENTS

| | | | | |
|---|---|---|---|---|
| 3,876,061 A | * | 4/1975 | Hammitt | B66B 21/12 198/792 |
| 4,066,161 A | * | 1/1978 | Michalon | B65G 23/30 198/334 |
| 5,571,254 A | * | 11/1996 | Saeki | B66B 21/12 198/324 |
| 6,170,632 B1 | * | 1/2001 | Shimura | B66B 21/12 104/167 |
| 7,588,139 B1 | * | 9/2009 | Campbell, III | B65G 15/105 198/407 |
| 8,739,957 B2 | * | 6/2014 | Teramoto | B66B 21/025 198/334 |
| 2003/0047425 A1 | | 3/2003 | Lessard | |
| 2015/0107967 A1 | | 4/2015 | Horn | |

FOREIGN PATENT DOCUMENTS

| | | |
|---|---|---|
| DE | 43 24 120 | 1/1995 |
| DE | 10 2004 063 704 | 7/2006 |
| DE | 10 2011 080414 | 2/2013 |
| GB | 1 466 965 | 3/1977 |
| JP | 3-21109 | 9/1991 |
| RU | 2012 132 477 | 1/2014 |
| WO | WO2015/074850 | 5/2015 |

* cited by examiner

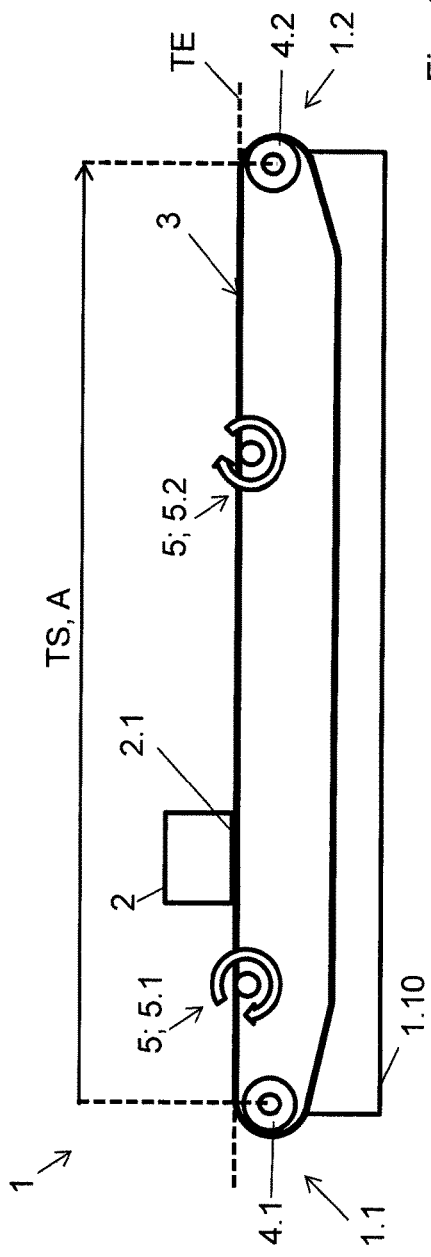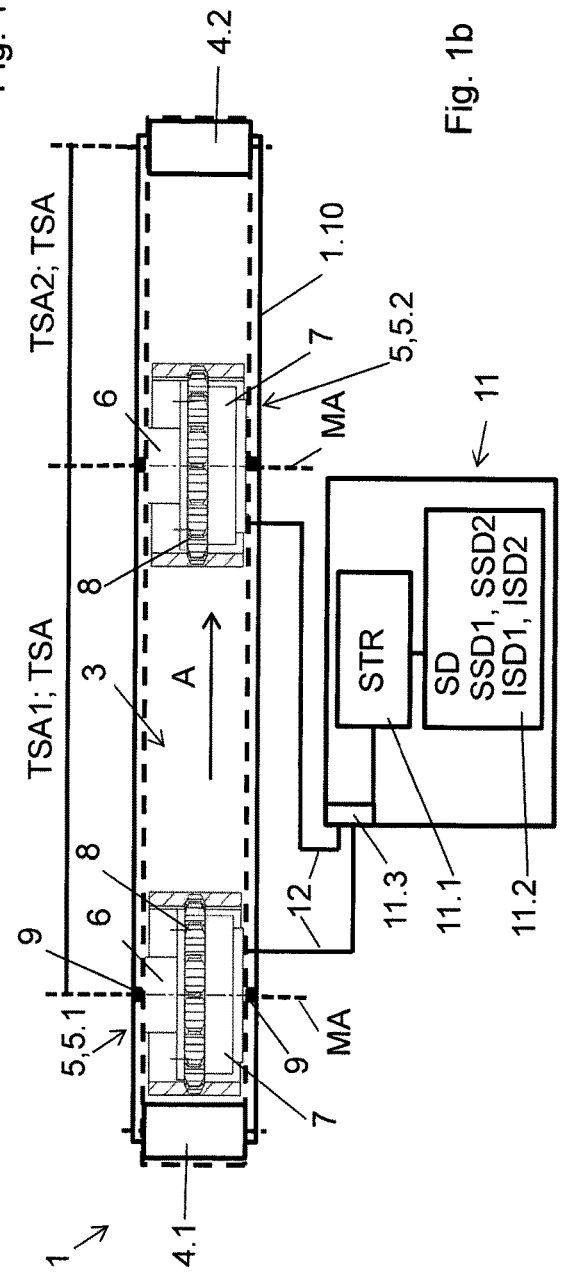

TRANSPORT DEVICE AND TRANSPORT METHOD COMPRISING SUCH A TRANSPORT DEVICE

RELATED APPLICATIONS

This application is the national stage under USC 371 of international application PCT/EP2016/068117, filed on Jul. 28, 2016, which claims the benefit of the Aug. 14, 2015 priority date of German application DE 102015113435.7.

FIELD OF INVENTION

The invention relates to transporting materials, and in particular, to a transport device.

BACKGROUND

A known way to transport materials is to use a transport device that has a conveyor. In some cases, one may wish to transport materials for a very long distance. One way to solve this problem is to use a very long conveyor.

However, this simple solution poses a problem. A conveyor has to move on something. Whatever that something is, it will cause friction. Each infinitesimal length of the conveyor will thus contribute a frictional force. As the conveyor becomes longer, the integral of the forces over the conveyor starts to approach the maximum tensile strength of the conveyor itself.

For this reason, when moving materials along a long distance, it is customary to have several conveyors adjacent to one another along the transport direction.

However transport devices of this type necessarily comprise transitions between conveyors. These transitions amount to gaps that can disturb the smooth flow of materials being transported.

It is usual to bridge these transitions using bridging structures such as transfer or container sliding elements, deflector elements, transfer stations, or deflector stations. Although these bridging structures serve to reduce the disturbance, they do not do so completely. The transport materials tend not to stand fully on the upper lengths of the transport elements as they pass across such transitions.

SUMMARY

In one aspect, a transport device has at least one transport element that comprises transport-element sections that are arranged so that they can rotate and be repositioned relative to one another in such a way that by repositioning and rotating the individual transport-element sections relative to one another is possible to change the overall length of the transport element.

The transport path comprises at least two transport-path sections, each extending between two drive-arrangements succeeding one another in a transport direction so that by targeted controlling, in particular with the respective adjacent transport path sections, of interactively connected drive arrangements with a differential speed, it is possible to create an accumulation of the transport materials that are present on this transport path section or a gap in the flow of those materials.

An advantage of the foregoing transport device is its ability to manage the tensile load. Having at least two drive arrangements evenly distributes the tensile load of the transport element over the transport path sections being driven by their corresponding drive arrangements. The plural drive arrangements thus make it possible to have significantly longer transport paths than those available in the prior art.

By providing a transport element whose overall length can be changed and that, by its respectively associated drive arrangement, can be operated individually and/or dynamically with a specific speed for each transport path section, it is possible to achieve an accumulation and/or acceleration of the transport materials that are present on the corresponding transport path section.

In some embodiments, a control unit connects to the drive arrangements that are each associated with the transport path sections connect. This permits coordinated control of the individual transport path sections.

Among these embodiments are those in which the control unit includes at least one processor unit, storage interacting with the processor unit, and an interface. Also among these embodiments are those in which it is the processor unit that executes a control routine and in which the storage provides temporary storage of actual, or measured control data and target control data. Such actual control data includes at least one of: recorded actual speed, actual direction of rotation, actual angle of rotation and at least one actual torque forming the target control data.

In another embodiment, the processor unit is configured to compare actual control data received over the interface with target control data and, depending on the comparison, to either convert the target control data into control data for the control routine or to define control commands that are transmitted to the corresponding drive arrangement of the corresponding transport path section so as to drive the respective transport path section in a controlled way depending on the control data generated by the control routine.

In some embodiments, the processor unit is configured to determine the actual control data from the nominal current needed to operate the respective drive arrangement.

In other embodiments, the processor device is configured to operate the respective drive arrangements in a master/slave coupling.

Embodiments include those in which the drive arrangements comprise directly-drivable electric motors and those in which a drive arrangement forms one or more of the deflection devices.

Further embodiments include those in which the transport path is straight, those in which it is curved, and those in which it has both straight and curved courses. Among these are embodiments in which a drive arrangement precedes a curve. Also among these are embodiments in which one drive arrangement precedes a curve and another follows it.

Another embodiment has at least two transport elements arranged square to the transport direction and adjacent to one another.

Also among the embodiments are those with two drive arrangements for each individual transport element. In this case the drive arrangements can be common to multiple transport elements such that at least two drive arrangements drive each individual transport element.

In yet other embodiments, the transport element sections are configured so that they can rotate and be repositioned relative to one another. Among these are embodiments in which the transport element includes a conveyor chain having chain links.

In yet other embodiments, the processor unit is configured so that it operates the drive arrangements associated with the transport path sections using different target control data for each section.

In other embodiments, the processor unit is configured to operate transport path sections that succeed one another when viewed in the transport direction in such a way that a front transport path section is operated at a higher target speed than a rear transport path section. However, in other embodiments, the converse is the case so that the front transport path section is operated at a lower speed than the rear transport path section. As used herein, "front" and "rear" are relative to the transport direction such that materials will reach the rear transport path section before they arrive at the front transport path section.

In yet another embodiment, the target control data in the processor unit is preset so that the respective transport path section is either fully extended or fully retracted.

Further embodiments include those in which the target control data in the processor unit has been preset so no extension or retraction of a first transport path section occurs until a second transport path section has already been fully extended or retracted.

As used herein, "substantially" and "around" refer to variations from the respective exact value by ±10%, preferably by ±5% and/or variations in the form of changes that are insignificant to function.

As used herein, the term "transport materials" refers to containers, such as cans, bottles, tubes, pouches, made from metal, glass, and/or plastic, as well as other packaging media, in particular including packaging media suitable for filling powdered, granulated, viscous, or liquid products. The term "transport materials" also includes cluster packs, such as packets, cartons, trays, and cases of film packs each comprising at least two containers and at least one outer packaging element that wraps or at least partially encloses those containers.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE FIGURES

The invention is explained in detail below through the use of embodiment examples with reference to the figures, in which:

FIG. 1a shows a side view of a transport device,

FIG. 1b shows a view from below the transport device of FIG. 1a,

DETAILED DESCRIPTION

FIGS. 1a and 1b show a transport device 1 for transporting transport materials 2 along a transport direction A between various structures that are commonly used in the packaging or beverage industry. These include container-treatment machines, deflector stations, and transfer stations. The transport direction A defines a front end 1.1 and a rear end 1.2 of the transport device 1.

The transport device 1 includes an endlessly circulating transport element 3 that forms a closed loop. Examples of a suitable transport element 3 include but are not limited to a transport belt, a conveyor chain, and a flat top chain.

Figure 3:
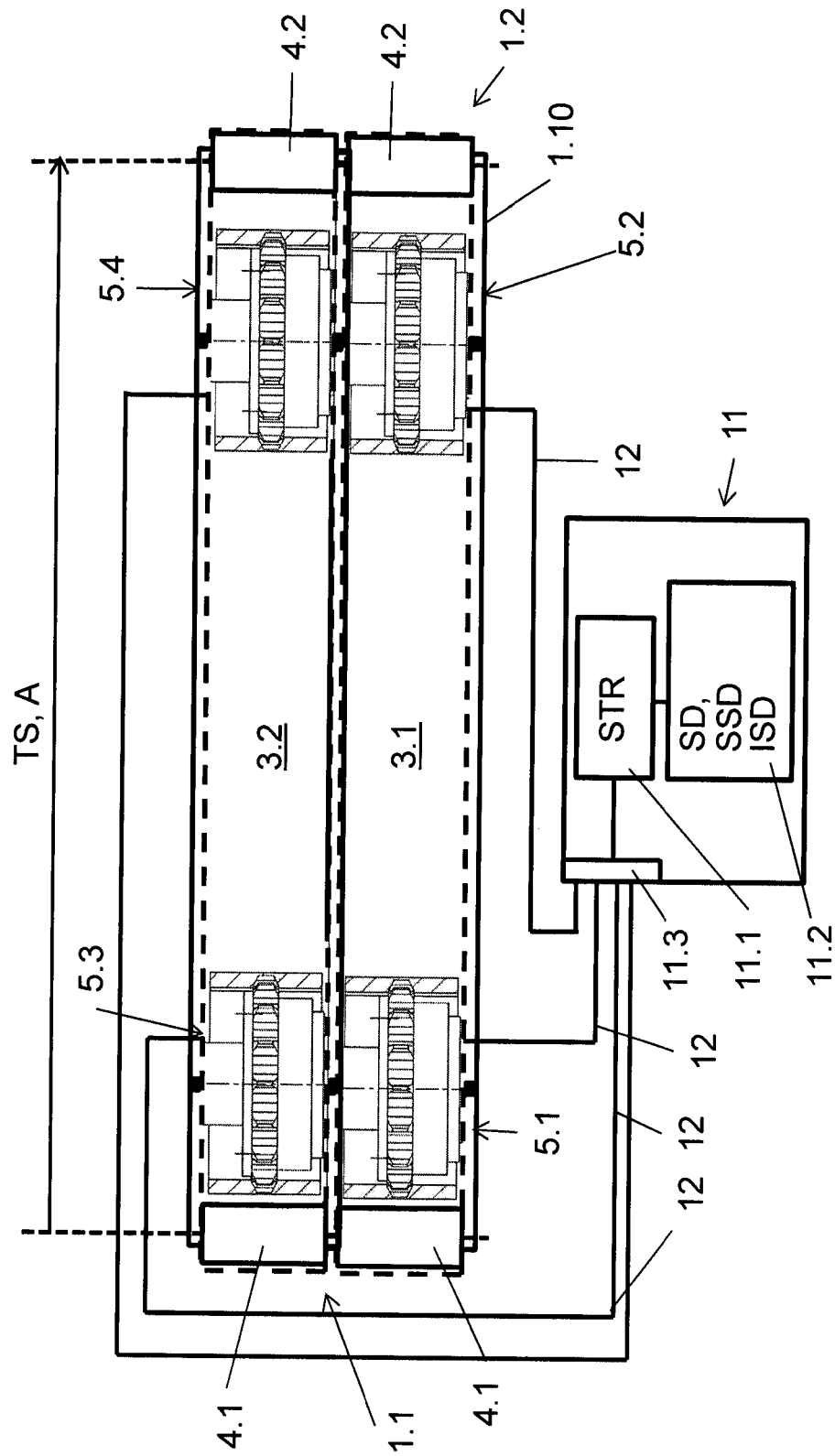
FIG. 3 shows a transport device with multiple transport elements as seen from below.

In the embodiment shown in FIG. 3, plural transport elements 3.1, 3.2 arranged adjacent to one another in multiple rows form a horizontal transport surface that extends across a transport plane TE on which the transport materials 2 stand upright on their respective bases 2.1.

A front deflection-device 4.1 is arranged below the transport plane TE at the front end 1.1. Similarly, a rear deflection-device 4.2 is arranged below the transport plane TE at the rear end 1.2. The front and rear deflection-devices 4.1, 4.2 are implemented as freely-rotating return-rollers arranged on a machine frame 1.10 of the transport device 1.

At the front end 1.1, the transport element 3 is guided over the front deflection-device 4.1. At the rear end 1.2, the transport element 3 is guided over the rear deflection device 4.2. The transport element 3 thus forms a transport path TS between the front and rear deflection-devices 4.1, 4.2.

The transport device 1 includes first and second drive arrangements 5.1, 5.2 that are spaced apart along the transport path TS. These drive arrangements 5.1, 5.2 drive the transport element 3. These drive arrangements 5.1, 5.2 can also be arranged below the transport plane TE on the machine frame 1.10. A control unit 11 controls the first and second drive-arrangements 5.1, 5.2 via a control line 12.

The transport path TS has first and second transport-path sections TSA1, TSA2, each of which extends along the transport direction A. In this configuration, the first transport-path section TSA1 extends from the first drive-arrangement 5.1 as far as the second drive-arrangement 5.2. The second transport-path section TSA2 extends from the second drive-arrangement 5.2 to the rear end 1.2 of the transport path TS.

The fact that only first and second drive arrangements 5.1, 5.2 are described herein is only for ease of exposition. Embodiments can include a transport element with three or more drive-arrangements 5. The number of drive arrangements 5 depends on any one or more factors that include: the size of the transport device 1, the length of the transport path TS, the mass of the transport materials 2 that must be conveyed, and the desired geometrical design of the transport path TS, for example, whether it is to be straight or curved.

If the transport path TS has a curve, then at least one drive arrangement 5 can be provided before the curve. In an especially preferable embodiment, first and second drive-arrangements 5.1, 5.2 flank the curve such that the first drive-arrangement 5.1 is before the curve and the second drive-arrangement 5.2 is after curve.

In one embodiment of the transport device 1, the first drive-arrangement 5.1 constitutes a front deflection device 4.1 and the second drive-arrangement 5.2 constitutes the rear deflection device 4.2. This means that both the circulatory driving and the deflecting of transport element 3 are carried out by one and the same element, namely the corresponding one of the first and second drive arrangements 5.1, 5.2. In this embodiment of the transport device 1, the first and second drive-arrangements 5.1, 5.2 also assume the functionality of the front and rear deflection-devices 4.1, 4.2.

In some embodiments, electric motors implement the first and second drive-arrangements 5.1, 5.2. Suitable types of electric motor include a gearless electric motor, a directly-driven electric motor, a stepper motor, a servo-motor, and a torque motor. The electric motor that includes an internal stator 6 and an external rotor 7. The internal stator 6 connects to the machine frame 1.10 so that it cannot rotate.

In those cases in which the transport element 3 uses chains on a peripheral face thereof, the external rotor 7 includes chain gearing 8 that concentrically surrounds a motor axis MA that is oriented square to the transport direction A. The first and second drive arrangement 5.1, 5.2 form the drive arrangement of the transport device 1. Each rotor 7 interactively connects to at least one transport element 3 using its gearing 8.

Figure 2:
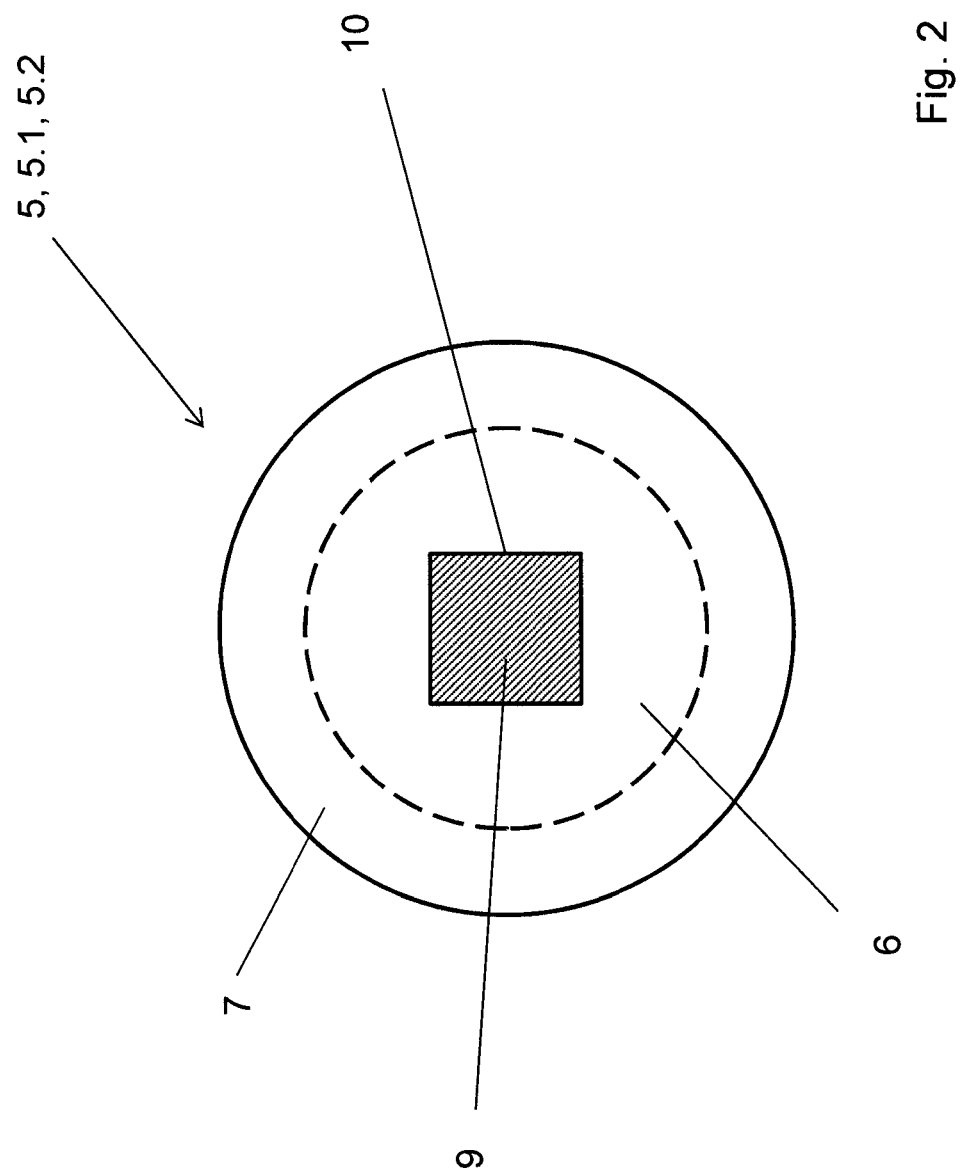
FIG. 2 shows one of the drive arrangements of the transport device according to FIGS. 1a and 1b arranged with its stator rotationally fixed on one axis.

A support shaft 9 has both ends thereof held on the machine frame 1.10 to prevent twisting. This support shaft 9 supports the stators 6 of the first and second drive-arrangement 5.1, 5. Referring to FIG. 2, each stator 6 has a recess or opening 10 with a non-circular cross-section. In the illustrated embodiment, the opening 10 has a square cross-section. The support shaft 9 has a cross section that matches that of the opening 10. This permits the support shaft 9 to prevent the stators 6 from twisting.

In an alternative embodiment, the first and second drive arrangements 5.1, 5.2 are arranged externally on the machine frame 1.10. Each drive arrangement 5.1, 5.2 uses its rotor 7 to transmit rotary motion to a drive shaft that connects to the transport element 3. The drive shaft establishes a frictional connection between the drive arrangement 5.1, 5.2 and the transport element 3.

A control unit 11 controls the first and second drive-arrangements 5.1, 5.2. A suitable control unit 11 is a machine control-system or a part of the machine control-system of either the transport device 1 or of a system that comprises the transport device 1. The control unit 11 permits the first and second drive-arrangements 5.1, 5.2 to be controlled and/or regulated in coordination with one another.

In some embodiments, a processor device 11.1 establishes master-slave coupling with the first and second drive-arrangements 5.1, 5.2. In some of these embodiments, the first and second drive-arrangements 5.1, 5.2 operate such that the first drive-arrangement 5.1 uses the control unit 11 to configures the master, i.e. command drive and the second drive arrangement 5.2 uses the control unit 11 to configure a slave, i.e. a follower drive coupled to the master drive. The first and second drive-arrangements 5.1, 5.2 alternate in their function. This promotes synchronization of the first and second drive-arrangements 5.1, 5.2.

The operation of the first and second drive-arrangement 5.1, 5.2 can be controlled by a control routine STR that is executed in the control unit 11. For this purpose, the control unit 11 comprises at least one processor unit 11.1 for executing the control routine STR. The control unit 11 also comprises a storage unit 11.2 that interacts with the processor unit 11.1 for storage of control data SD that is transmitted to and received by the first and second drive arrangement 5.1, 5.2 via an interface 11.3 from the control unit 11 over the control line 12.

The control data SD comprises actual control-data ISD1, ISD2 determined at the first and second drive-arrangements 5.1, 5.2. Examples of such actual control-data ISD1, ISD2 include actual speed IDZ1, IDZ2, actual direction of rotation IDR1, IDR2, actual angle of rotation IDW1, IDW2, and actual torque IDM1, IDM2. The control data SD also includes corresponding target control data SSD1, SSD2. Examples of such target control data include such target speed SDZ1, SDZ2, target direction of rotation SDR1, SDR2, target angle of rotation SDW1, SDW2, and target torque SDM1, SDM2.

In the foregoing nomenclature, the parameters identified by the suffix "1" relate to the first drive arrangement 5.1 and those identified by the suffix "2" relate to the second drive arrangement 5.2. In those embodiments with more than two drive-arrangements, a corresponding parameter set of actual and target data with a corresponding suffix will be stored as part of the control data SD in the control unit 11 for those additional drive-arrangements.

In some embodiments, the processor unit 11.1 determines actual control data ISD from the nominal current needed to operate the drive arrangement 5.1, 5.2 in order to generate a corresponding drive motion by way of the transport element 3. The drive motion generated by the transport element 3 can also be deduced from the change over time of the nominal current and/or power consumption or from the change over time of the power consumption of the first and second drive-arrangements 5.1, 5.2.

The processor unit 11.1 compares actual control data ISD received across the interface 12.3 with target control data SSD and as a function thereof to convert it to control data SD for control routine STR, and/or to define control commands that are transmitted to the corresponding drive arrangement 5.1, 5.2 of the corresponding transport path section TSA. This results in controlled operation of a transport path section TSA as a function of control data SD that is generated by way of a control routine STR. Predefined, i.e. preselected, target control data SSD can also be stored in the storage unit 10.2.

Unlike the embodiment in FIGS. 1a, 1b and 2, FIG. 3 shows a schematic view from below of an embodiment of the transport device 1 having a plurality of transport elements 3, in particular a first and a second transport element 3.1, 3.2 each configured as a closed loop. Each of the two transport elements 3.1, 3.2 has first, second, third, and fourth drive-arrangements 5.1, 5.2, 5.3, 5.4 that are spaced apart from one another and connected to the respective transport element 3.1, 3.2 at different locations along the transport path TS. More specifically, the first and second drive-arrangements 5.1, 5.2 are for the first transport element 3.1, while the third and fourth drive-arrangements 5.3, 5.4 are for the second transport element 3.2. The control line 12 connects the control unit 11 to the four drive-arrangements 5.1-5.4.

The transport device 1 also provides two front deflection devices 4.1 at the front end 1.1 and two rear deflection devices 4.2 at the rear end 1.2. Each of the deflection devices 4.1, 4.2 rotates as a result of having been arranged on a common axis on the machine frame 1.10. The front two and rear two deflection devices 4.1, 4.2 can each be arranged so as to rotate independently of one another about their corresponding axis in such a way that different transport speeds can be realized with the first and second transport element 3.1, 3.2.

In an alternative embodiment, the first and second drive-arrangements 5.1, 5.2 are common to all of the transport elements 3. As a result, each of the transport elements 3 is driven by at least two drive-arrangements, namely the first drive arrangement 5.1 and the second drive arrangement 5.2.

In some embodiments, each of the first and second transport elements 3.1, 3.2 can be interactively connected at its front end 1.1 with the first drive-arrangement 5.1 and at its rear end 1.2 with the second drive-arrangement 5.2 so that each individual transport element 3.1, 3.2 is interactively connected to at least two drive-arrangements 5.1, 5.2 that are used by both transport elements 3.1, 3.2 in common. The drive arrangements 5.1, 5.2 each operate a drive shaft that is interactively connected to both the first and second transport-elements 3.1, 3.2.

Figure 4:
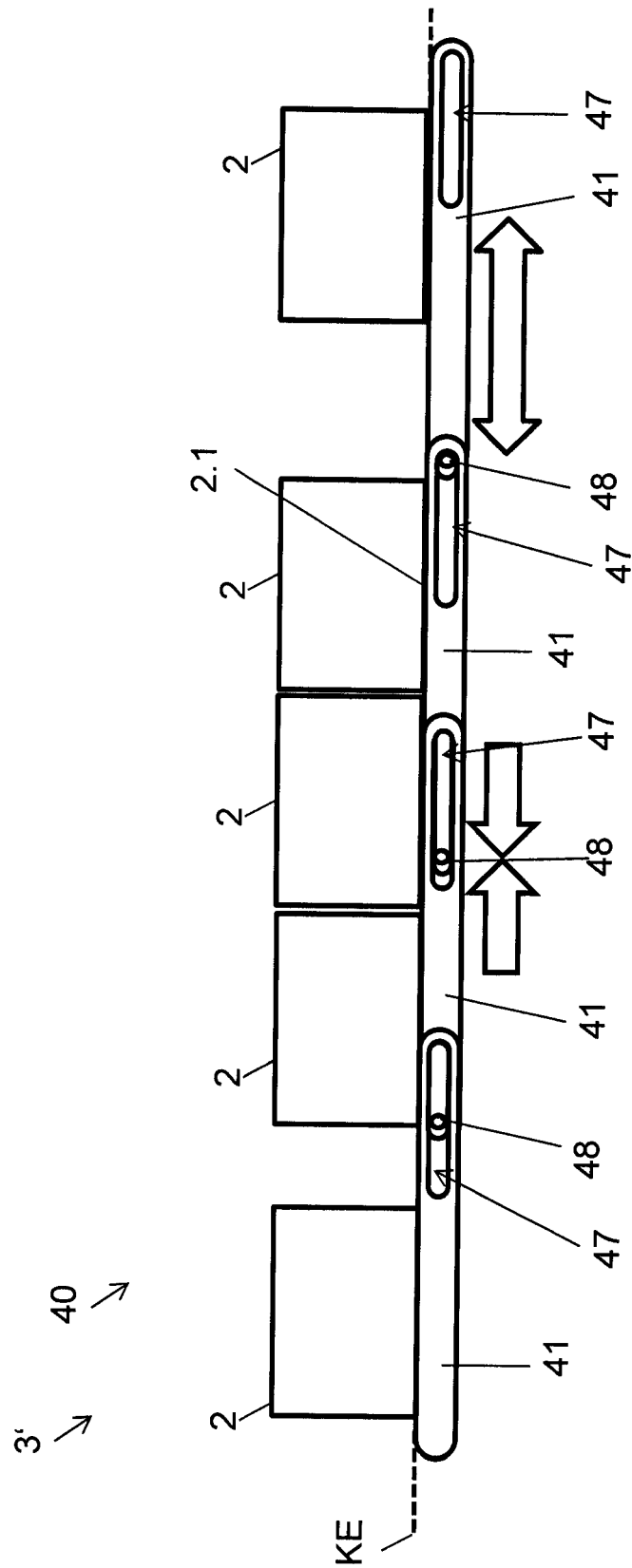
FIG. 4 shows a schematic side view of a transport element.
Figure 5:
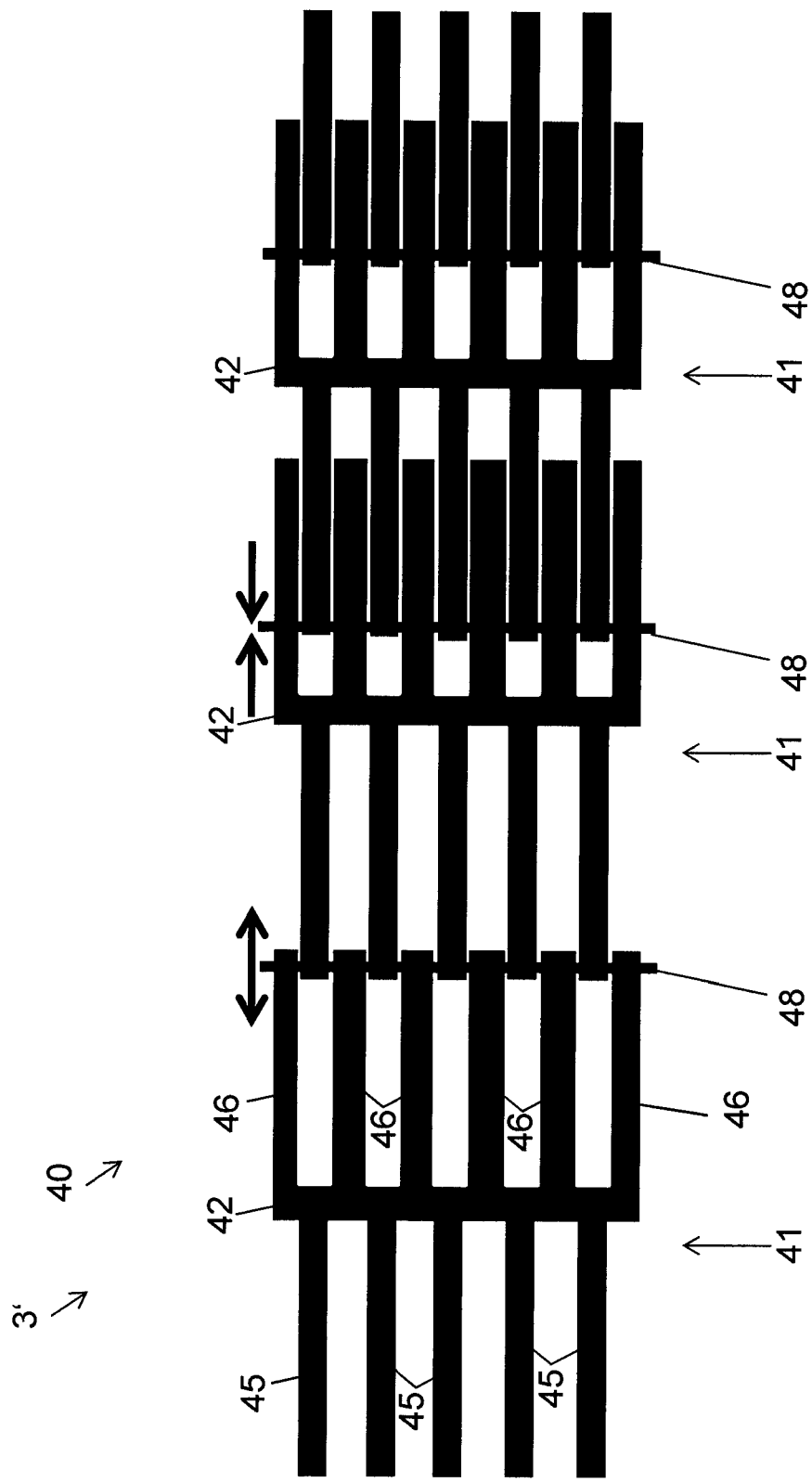
FIG. 5 shows a schematic view from above the transport element shown in FIG. 4.
Figure 7:
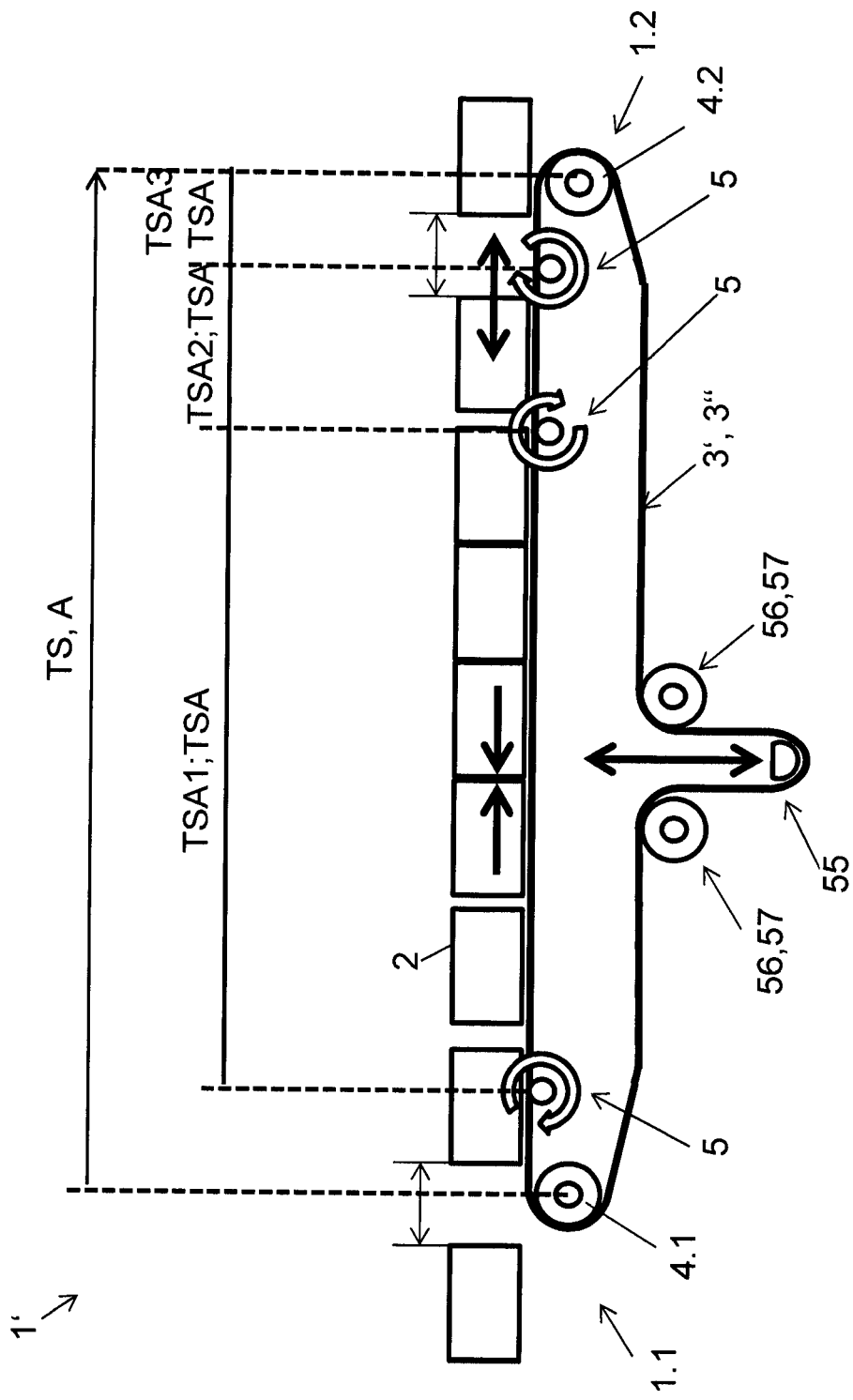
FIG. 7 shows a side view a transport device with a transport element according to FIGS. 4 and 5.

FIGS. 4 and 5 show a side view of and view from above a transport element 3' for another embodiment of the transport device 1' shown and described in more detail in FIG. 7. In this embodiment, the transport element 3' of FIGS. 4 and 5 comprises transport-element sections that can rotate and that can be repositioned relative to one another so that the overall length of the transport element 3' can be increased or reduced by repositioning the individual transport-element sections relative to each another. In the illustrated embodiment, the transport element 3' is a conveyor chain 40 having chain links 41, i.e. the transport element sections, that among themselves can rotate and can be repositioned relative to one another so that the overall length of the conveyor chain can be changed, i.e. increased or reduced, by repositioning the individual chain links 41 relative to one another. The arrows in FIGS. 4 and 5 illustrate this repositioning ability.

Referring now to FIG. 5, each chain link 41 has a longitudinally extending carrier-section 42 from which both a first and a second chain-link section branch off on both sides along the longitudinal extension of the carrier section 42 at an angle of 180°. Parallel chain-link elements 45, 46 form the first and second chain-link sections. Thus the chain-link elements 45 of the first chain-link section and the chain-link elements 46 of the second chain-link section ultimately span a common chain-link plane KE, shown in FIG. 4, that coincides with transport plane TE. In the embodiment shown in FIGS. 4 and 5, there are five chain-link elements 45 and six chain-link elements 46 that are arranged at the same or approximately the same distance from and parallel to one another on the common carrier section 42 to form a single chain link 41.

As is shown in FIG. 5, respective chain links 41, in particular their chain-link elements 46 of the second chain-link section, have slots 47, best seen in FIG. 4. The slots 47 extend parallel to the chain-link plane KE. A pin 48 of one chain link 41 engages the slot 47 of an adjacent chain-link 41 to enable repositioning of the individual chain links 41 relative to one another by repositioning pins 48 along corresponding slots 47. Repositioning the pins 48 repositions the individual chain links 41 relative to one another, thus changing the overall length of the conveyor chain 40.

Figure 6B:
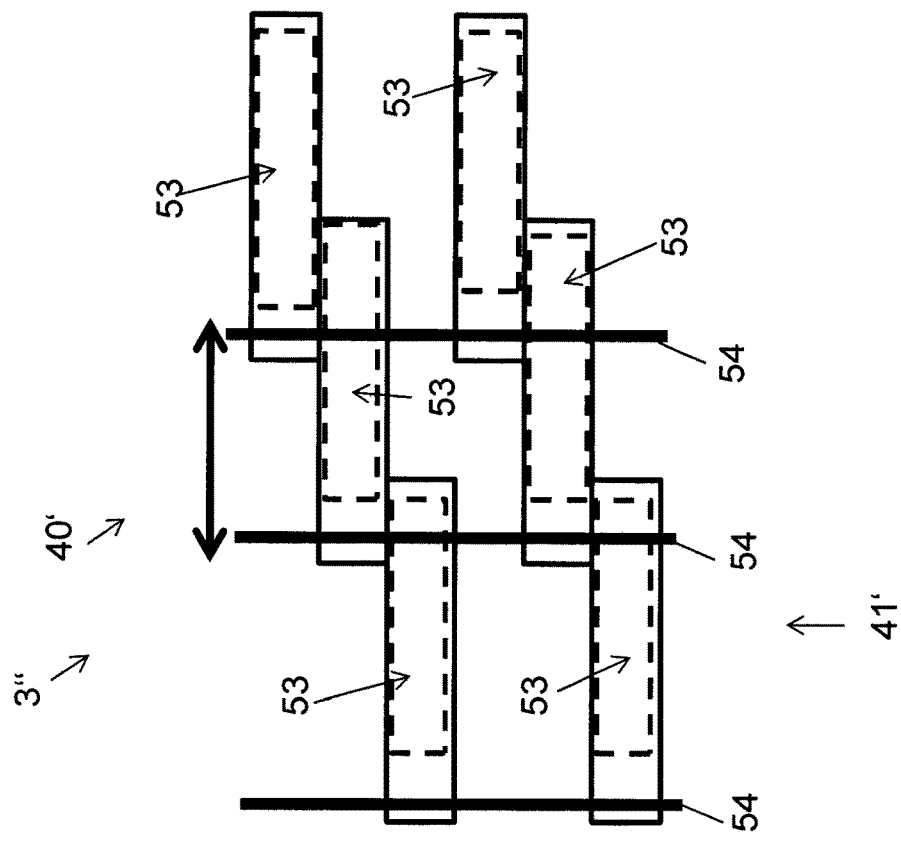
FIG. 6b shows a view from above the transport element in FIG. 6b but in the extended condition.
Figure 6A:
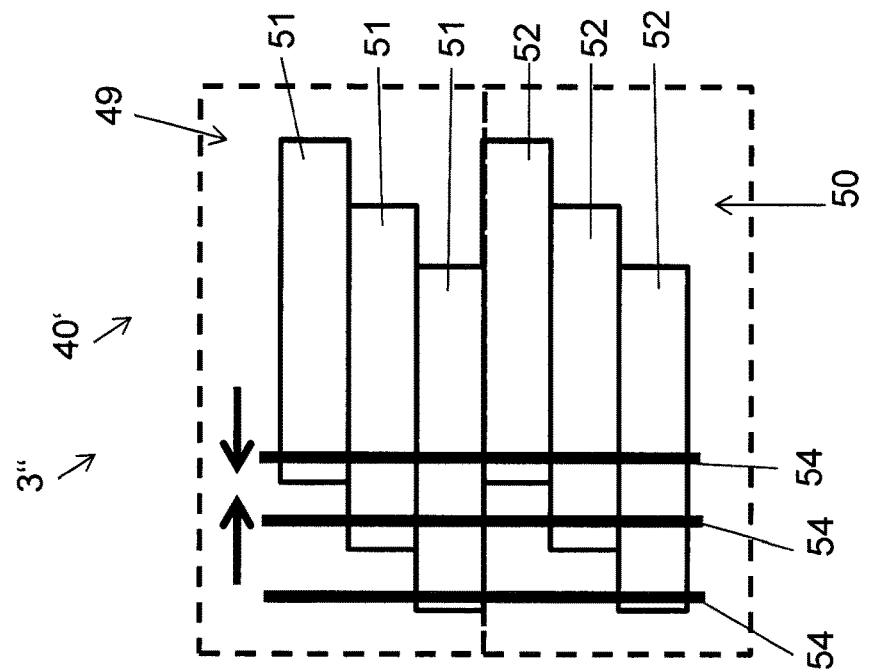
FIG. 6a shows a view from above a transport element in the retracted condition.

FIGS. 6a and 6b show a view from above another example of a transport element 3" in which the individual transport element sections rotate and change length. In this embodiment, the transport element 3" again comprises transport-element sections that can rotate and that can be repositioned relative to one another, thus making it possible to change the overall length of the transport element 3'. Because the individual transport element sections are additionally configured to be able to rotate and change length, the transport element 3" as a whole achieves greater length variability than that shown in the embodiment of FIGS. 4 and 5.

The transport element 3" of FIGS. 6a and 6b can also be configured as a conveyor chain 40' comprising a plurality of chain links 41', i.e. transport-element sections, that among themselves can rotate and can be repositioned relative to one another in such a way that it is possible to change the overall length of the conveyor chain by repositioning the individual chain links 41' relative to one another. FIGS. 6a and 6b show a single chain-link 41' in a retracted and an extended condition respectively.

The chain link 41' comprises a first chain-link segment 49 and a second chain-link segment 50, both which can be seen in FIG. 6a. The chain link 41' also comprises individual first and second chain-link elements 51, 52, with the first chain-link element 51 being associated with the first chain-link segment 49 and the second chain-link element 52 being associated with the second chain-link segment 50. Each of the first and second chain-link elements 51, 52 also comprises a slot 53 that extends along the longitudinal extension of the chain-link elements 51, 52.

On each of the sides facing away from the slot 53, a pin 54 passes between corresponding slots 53 of chain-link elements 51 of the first chain-link section 49 and the corresponding chain-link elements 52 or their associated slots 53 of the second chain-link section 50. The pins 54 can be repositioned along the corresponding slots 53 so that the chain link 41' can change its length between a retracted position, as shown in FIG. 6a, and an extended position, as shown in FIG. 6b.

FIG. 7 shows another embodiment of the transport device 1' according to FIGS. 1a and 1b. This embodiment differs because a transport element 3', 3" according to FIG. 4, 5, 6a, or 6b is provided on the transport device 1' according to FIG. 7. For driving the transport element 3', 3", the transport device 1' also provides three drive-arrangements 5 that are spaced apart from one another and interactively connected with the transport element 3', 3" at different locations along the transport path TS. For reasons of clarity a depiction of the control unit has been dispensed with, but this is also present in the embodiment of FIG. 7 and interactively connected to each of the three drive-arrangements 5 by way of control lines that have likewise been omitted for clarity. The control unit is configured according to the description for FIGS. 1a and 1b.

The transport path TS can comprise at least two transport path sections TSA, each extending between two drive-arrangements 5 that succeed one another in the transport direction A. Each transport path section TSA is formed from plural transport-element sections, i.e. for example the chain links 41,41' of the transport elements 3', 3".

The embodiment of FIG. 7 features a first transport path section TSA1, a second transport path section TSA2, and a third transport path section TSA3. Provision can also be made for a plurality of drive-arrangements 5 to be associated with one transport path section TSA, thus for a transport path section TSA to be constituted of a plurality of 2 transport path sections TSA. When viewed in transport direction A therefore, the drive arrangement 5 arranged at the front end 1.1 is associated with the first transport path section TSA1, the central drive arrangement 5 is associated with the second transport path section TSA2, and the drive arrangement 5 arranged at the rear end 1.2 is associated with the third transport path section TSA3.

In this embodiment, each transport path section TSA can be operated by the drive arrangement 5 that is associated with it. This can be effected with target control data SSD, such as target speed SDZ, target angle of rotation SDW, or target torque SDM. The target control data SSD is coordinated with other drive-arrangements 5.

Provision can be made for example for transport path sections TEA to be controlled in coordination with one another and with different target control data SSD, for example a different target speed SDZ, by way of the control unit 11. By configuring the transport element 3', 3" according to the embodiments in FIG. 4, 5, 6a, or 6b therefore, individual transport path sections TSA can be realized on the transport path TS with different additional properties, such as for example accumulation of or gap formation between the respective transport materials 2.

The first transport path section TSA1 can be operated at a target speed SDZ that is higher than that of the second transport path section TSA2. As a result, a reduction in the length of the transport element 3', 3" occurs along first transport path section TSA1 with a resulting accumulation of the transport materials 2 that are present on this first transport path section TSA1 of the transport path TS.

Then again, the third transport path section TSA3 can be operated at a target speed SDZ that is higher than that of the second transport path section TSA2. Along the second transport path section TSA2 this leads to an increase in the length of the transport element 3', 3" and consequently to formation of a gap in the transport materials 2 present on this second transport path section TSA2 of the transport path TS. In other words, by a targeted controlling of the adjacent transport path sections TSA at a differential speed, it is possible by way of the drive-arrangements 5 to either form an accumulation of the transport materials 2 that are present on this transport path section TSA or to form a gap in those transport materials 2.

In one embodiment, target control data SSD is preset in the processor unit 11.1 in such a way that the respective transport path section TSA is fully elongated, i.e. extended or stretched, and/or fully retracted, i.e. compressed or pushed together. In other embodiments, the target control data SSD is preset in the processor unit 11.1 in such a way that a lengthening and/or shortening of a transport path section TSA is not effected until the stretching and/or compressing of the other transport path section TSA is fully effected, i.e. finally complete.

In another embodiment, the transport device 1' has a chain buffer or chain store 55. Depending on the operating state of the transport device 1', the chain store 55 either absorbs superfluous lengths of the transport element 3', 3" or supplies additional lengths of the transport element 3', 3" as they are needed. The superfluous lengths typically include those transport element sections that are not currently required. Further deflection devices 56 and/or the separate drive-arrangements 57 can be associated with the chain store 55 for this purpose.

The invention has been described hereinbefore by reference to embodiments. It goes without saying that numerous variations as well as modifications are possible without departing from the concept underlying the invention.

The invention claimed is:

1. An apparatus comprising a transport device for transporting materials in a transport direction, said transport device comprising a front deflection-device, a rear deflection-device, a first drive-arrangement, a second drive-arrangement, and a first transport-element that comprises rotatable transport-element sections and that defines a transport path between said front deflection-device and said rear deflection-device, wherein said transport path comprises a first transport-path section and a second transport-path section arranged in succession along said transport direction and extending between said first drive-arrangement and said second drive-arrangement, wherein said transport path transports said materials, wherein, as a result of being guided over said front deflection-device and said rear deflection-device, said first transport-element forms a closed loop around which said first transport-element circulates, wherein said first drive-arrangement and said second drive-arrangement cooperate to drive said first transport-element, wherein said first drive-arrangement and said second drive-arrangement are spaced apart from each other along said transport path, wherein said first drive-arrangement and said second drive-arrangement are interactively connected to said first transport-element at different locations along said transport path, wherein said rotatable transport-element sections are capable of being repositioned relative to one another to change an overall length of said first transport-element, and wherein said first and second drive arrangements are controlled to cause said first and second transport-path sections to move at different speeds to create one of an accumulation and a gap on one of said first and second transport-path sections.

2. The apparatus of claim 1, further comprising a control unit, wherein said control unit is connected to said first drive-arrangement and to said second drive-arrangement, wherein said control unit provides coordinated control over said first and second transport-path sections.

3. The apparatus of claim 2, wherein said control unit comprises a processor, storage, and an interface, said storage interacting with said processor and said interface providing a mechanism for communicating with said control unit.

4. The apparatus of claim 3, wherein said processor is configured to execute a control routine for controlling said first and second drive-arrangements.

5. The apparatus of claim 3, wherein said storage is configured for storage of measured control data and target control data, said measured control data including data indicative of speed, direction of rotation, angle of rotation, and a torque.

6. The apparatus of claim 3, wherein said processor is configured to compare said measured control data with said target control data, said measured control data having been received through said interface, wherein said processor is further configured to modify said control routine to control said first and second drive-arrangements based on a comparison between said measured control data and said target control data.

7. The apparatus of claim 3, wherein said processor is configured to determine measured control data based at least in part on a nominal current, wherein said nominal current is a current that is needed to operate one of said first and second drive-arrangements.

8. The apparatus of claim 3, wherein said processor is configured to define a master drive and a slave drive, said master drive and said slave drive being selected from the group consisting of said first drive-arrangement and said second drive-arrangement.

9. The apparatus of claim 1, wherein said first and second drive-arrangements comprise direct-drive electric motors.

10. The apparatus of claim 1, wherein said transport path comprises a straight course.

11. The apparatus of claim 10, wherein said straight course is disposed between said first and second drive-arrangements.

12. The apparatus of claim 1, wherein said front and rear deflection-devices are formed by corresponding ones of said first and second drive-arrangements.

13. The apparatus of claim 1, further comprising a second transport-element, wherein said first and second transport-elements are adjacent to each other, and wherein said first and second transport elements are arranged square to said transport direction.

14. The apparatus of claim 13, wherein said second transport-element comprises at least a pair of drive-arrangements.

15. The apparatus of claim 13, wherein said first and second drive-arrangements are common to said first and second transport-elements, whereby each transport element is driven by said first and second drive-arrangements.

16. The apparatus of claim 15, wherein said second transport-element comprises rotatable transport-element sections that configured to rotate and to be repositioned relative to one another to change an overall length of said second transport-element.

17. The apparatus of claim 1, wherein said first transport-element comprises a conveyor chain that comprises a plurality of chain links.

18. The apparatus of claim 1, further comprising a processor configured to operate said first drive-arrangement with first target control data and to operate said second drive-arrangements with second target control data, wherein said first and second target control data differ from each other.

19. The apparatus of claim 18, wherein said first transport-path section and said second transport-path section comprise a front transport-section and a rear transport-section, wherein material reaches said rear transport-section before reaching said front transport-section, wherein said processor is configured to control said front and rear transport-sections such that said front transport-section conveys at a higher speed than said rear transport-section.

20. The apparatus of claim 18, wherein said first transport-path section and said second transport-path section comprise a front transport-section and a rear transport-section, wherein material reaches said rear transport-section before reaching said front transport-section, wherein said processor is configured to control said front and rear transport-sections such that said front transport-section conveys at a lower speed than said rear transport-section.

21. The apparatus of claim 1, further comprising a control unit that provides coordinated control over individual transport path sections, wherein said control unit controls said first and second drive-arrangements based at least in part on target control data that is preset such that a third transport-path section is in a particular state, wherein said particular state is selected from the group consisting of a fully-extended state and a fully-retracted state, and wherein said third transport-path section is selected from the group consisting of said first transport-path section and said second transport-path section.

22. The apparatus of claim 1, further comprising a control unit that provides coordinated control over individual transport path sections by controlling said first and second drive-arrangements based at least in part on target control data that is preset in such a way that changing a length of a third transport-path section occurs only after a change in length of a fourth transport-path section has been effected, wherein said third and fourth transport-path sections are selected from the group consisting of said first and second transport-path sections.

23. A process for using a product, said product comprising a transport device for transporting materials in a transport direction, said transport device comprising a front deflection-device, a rear deflection-device, a first drive-arrangement, a second drive-arrangement, and a first transport-element that comprises rotatable transport-element sections and that defines a transport path between said front deflection-device and said rear deflection-device, wherein said transport path comprises a first transport-path section and a second transport-path section arranged in succession along said transport direction and extending between said first drive-arrangement and said second drive-arrangement, wherein said transport path transports said materials, wherein, as a result of being guided over said front deflection-device and said rear deflection-device, said first transport-element forms a closed loop around which said first transport-element circulates, wherein said first drive-arrangement and said second drive-arrangement cooperate to drive said first transport-element, wherein said first drive-arrangement and said second drive-arrangement are spaced apart from each other along said transport path, wherein said first drive-arrangement and said second drive-arrangement are interactively connected to said first transport-element at different locations along said transport path, wherein said rotatable transport-element sections are capable of being repositioned relative to one another to change an overall length of said first transport-element, and wherein said first and second drive arrangements are controlled to cause said first and second transport-path sections to move at different speeds to create one of an accumulation and a gap on one of said first and second transport-path sections, wherein said process comprises transporting materials in a transport direction using said transport device.

24. The method of claim 23, wherein transporting materials comprises transporting beverages.

* * * * *